United States Patent [19]

Wu

[11] Patent Number: 5,421,680
[45] Date of Patent: Jun. 6, 1995

[54] METHOD AND DEVICE FOR PREVENTING A DRILLING CHIP FROM WINDING AROUND DRILL BIT AND FOR REMOVING A DRILLING CHIP DEPOSITED IN FLUTES OF DRILL BIT

[76] Inventor: Chin-Long Wu, No. 136-12, Young Ho Road, Ta-Ya Hsiang, Taichung Hsien, Taiwan, Prov. of China

[21] Appl. No.: 249,924

[22] Filed: May 26, 1994

[51] Int. Cl.⁶ .................. B23B 35/00; B23B 47/00
[52] U.S. Cl. ........................... 408/1 R; 408/67; 408/241 R
[58] Field of Search ........... 408/67, 227, 230, 241 G, 408/241 R, 710

[56] References Cited

U.S. PATENT DOCUMENTS

| | | |
|---|---|---|
| 3,837,383 | 9/1974 | Ko ............................. 408/67 |
| 4,514,120 | 4/1985 | Hougen ...................... 408/67 |

FOREIGN PATENT DOCUMENTS

| | | | |
|---|---|---|---|
| 37031 | 2/1984 | Japan ........................... 408/67 |
| 260709 | 10/1988 | Japan ........................... 408/67 |
| 814656 | 3/1981 | U.S.S.R. ...................... 408/67 |
| 1215885 | 3/1986 | U.S.S.R. ...................... 408/67 |

*Primary Examiner*—Daniel W. Howell
*Attorney, Agent, or Firm*—Browdy and Neimark

[57] ABSTRACT

A method and a device for preventing a drilling chip from winding around a drill bit and for removing the drilling chip deposited in flutes of the drill bit comprising a drill bit acting as a driving member and a driven gear having at least one tooth engageable with flutes of the drill bit. As the drill bit is turned to drill a hole, the driven gear is actuated to turn such that the tooth of the driven gear engages the flute of the drill bit so as to scrape off any drilling chip deposited in the flute of the drill bit and to prevent the drilling chip from winding around the drill bit in action. The driven gear is rotatably and movably fastened to a support rod which is in turn fastened to a drill press.

3 Claims, 3 Drawing Sheets

METHOD AND DEVICE FOR PREVENTING A DRILLING CHIP FROM WINDING AROUND DRILL BIT AND FOR REMOVING A DRILLING CHIP DEPOSITED IN FLUTES OF DRILL BIT

FIELD OF THE INVENTION

The present invention relates generally to a drill, and more particularly to a method and a device for preventing automatically a drilling chip from winding around a drill bit in operation and for removing automatically a drilling chip deposited in the flutes of the drill bit in action.

BACKGROUND OF THE INVENTION

As shown in FIG. 1, a drilling chip 16 is produced continuously by a drill bit 10 in operation. The drill operator is often annoyed and frustrated by the drilling chip 16 which tends to wind around the drill bit 10 and to deposit in flutes 13 of the drill bit 10. The deposited chip is a potential safety hazard to the drill operator in view of the fact that the deposited chip is hot and sharp, and that the deposited chip is carried along with the rotating drill bit. In order to remove the deposited chip, the drill operator must stop the operating drill. The progress of the drilling work is therefore undermined by the work stoppage to facilitate the removal of the deposited chip. In addition to being a safety hazard, the deposited chip is an obstacle obstructing the flow of the drilling fluid to the cutting edge of the drill bit, thereby causing the drill bit to be subjected to the damaging effect of a severe friction. As a result, the service life span of the drill bit is shortened. Furthermore, the drilling chip which is deposited in the flutes of the drill bit is often the source of a resistance responsible for the jamming of the dulled drill bit inside the hole that is being drilled. The current trend of industrial automation calls for the development of an automated drilling machine, which must be provided with an automatic device for preventing the drilling chip from winding around the drill bit in action and for removing effectively the drilling chip deposited in the flutes of the drill in operation.

The prior art method of preventing the drilling chip from winding around the drill bit and of removing the drilling chip deposited in the flutes of the drill bit requires that the operating drill bit must be first stopped before the machine operator is allowed to remove the wound chip and the deposited chip by means of an iron hook, which is used by the machine operator to hook and move the chip along the flutes of the drill bit. Such a conventional method as described above is rather time-consuming and hazardous to the safety of the machine operator. In addition, the drilling efficiency is greatly compromised by the fact that the drill at work must be stopped so as to permit the machine operator to do the job of removing the wound chip and the deposited chip.

SUMMARY OF THE INVENTION

It is therefore the primary objective of the present invention to provide a method and a device for preventing automatically a drilling chip from winding around a drill bit in operation and for removing automatically a drilling chip deposited in flutes of the drill bit in operation without having to stop the drill bit in operation.

It is another objective of the present invention to provide an easy method and a device simple in construction, operation and installation for preventing automatically a drilling chip from winding around a drill bit in operation and for removing automatically a drilling chip deposited in flutes of the drill bit in operation without having to stop the drill bit in operation.

The foregoing objectives of the present invention are attained by a method and a device, which are characterized in that the drill bit is regarded purposefully as a gear (a driving member) engageable with a disk gear (a driven member) for providing a precision driving, thereby enabling the driven member to act to prevent effectively the drilling chip from winding around the drill bit in action and to remove effectively the drilling chip deposited in flutes of the drill bit in operation.

The method and the device of the present invention are further characterized in that the driven member (disk gear) is mounted on a support rod which can be coupled with a drill press in such a manner that the support rod can be moved and swiveled in relation to the center of the drill bit, and that the driven member can be driven by the drill bit with precision so as to prevent effectively the drilling chip from winding around the drill bit in action and to remove effectively the drilling chip deposited in flutes of the drill bit at work.

The method and the device of the present invention are still further characterized in that the device is provided with a number of driven members of various dimensions and having various forms and numbers of teeth for enabling the various driven members to cooperate with the drill bits of various diameters and having various numbers of flutes.

DETAILED DESCRIPTION OF THE INVENTION

Figures 1, 2:
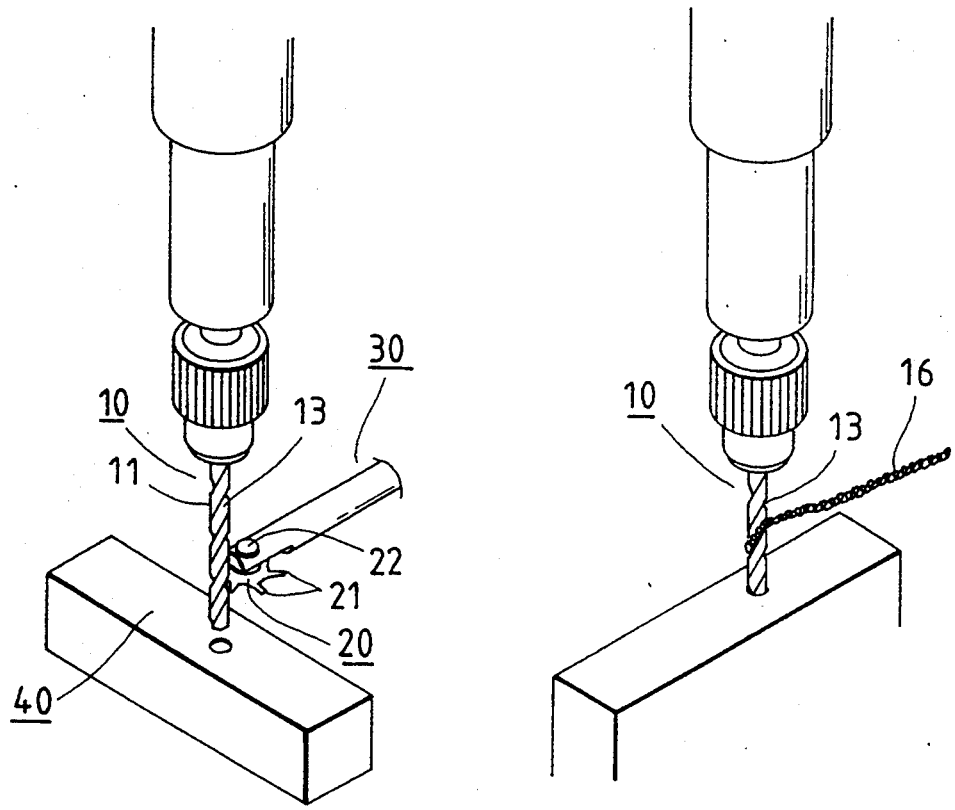
FIG. 1 shows a schematic view illustrating the way that a drilling chip is produced in the prior art drilling operation.
FIG. 2 is a perspective view of the present invention and showing that the device of the present invention is located at one side of a drill bit.
Figure 3:
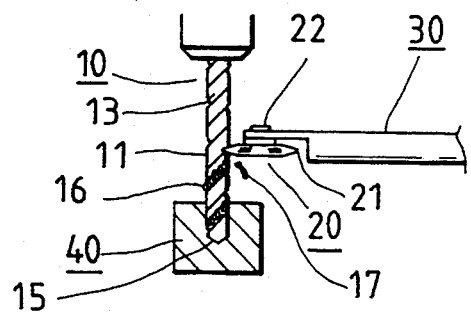
FIG. 3 is a front elevational view of the present invention and showing that a drill bit is caused to move upwards and downwards.

As shown in FIGS. 2 and 3, the present invention comprises a driven gear 20, which is driven by a drill bit 10 having spiral portions 11 and 12, and flutes 13 and 14. Located by one side of the drill bit 10 is a support rod 30 provided at one end thereof with the driven gear 20 pivoted thereto such that teeth 21 of the driven gear 21 mesh with the flute 13 of the drill bit 10. As the drill bit 10 is rotated, the driven gear 20 is caused to turn on a shaft 22. The driven gear 20 is caused to turn at its original position at the time when the drill bit 10 is in action of drilling a hole in a work piece 40. In other words, the driven gear 20 is caused to engage the drill bit 10.

Figure 4:
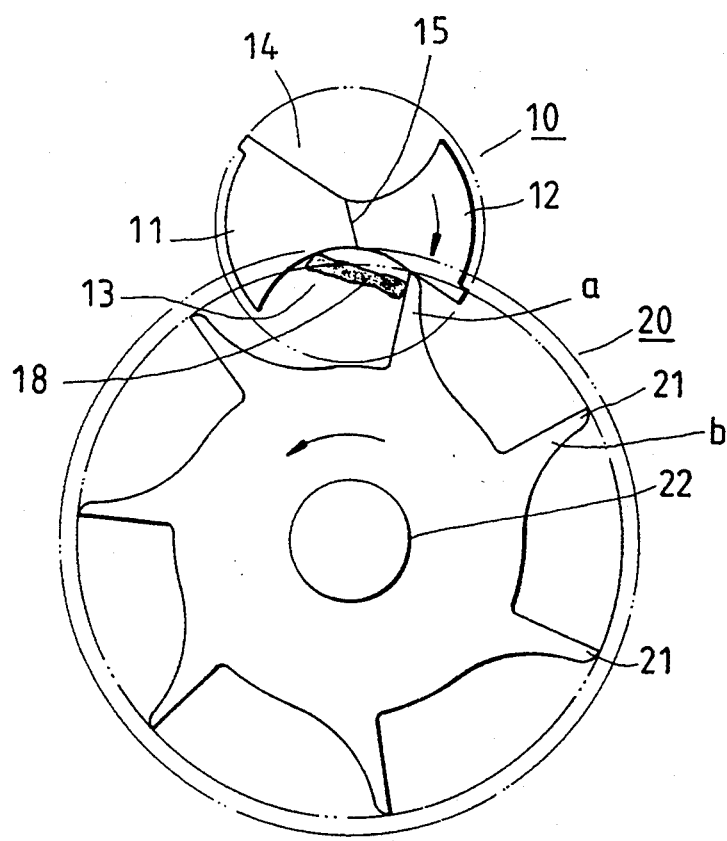
FIG. 4 is a schematic view showing a relative relationship between a driven gear and a drill bit according to the present invention.
Figure 5:
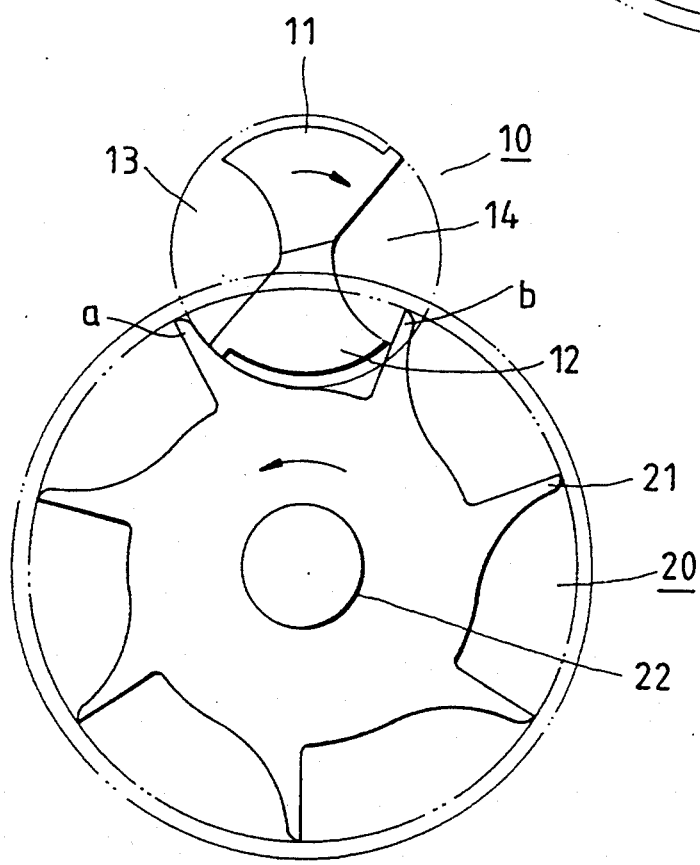
FIG. 5 is similar to FIG. 4, with the difference being that the former includes the driven gear which is driven by the drill bit to be in another position.

As shown in FIG. 4, the driven gear 20 has a tooth 21a, which is caused to mesh with the flute 13. The tooth 21a is subsequently driven to disengage the flute 13. Now referring to FIG. 5, the driven gear 20 is shown comprising another tooth 6, which is driven gradually into another flute 14. As long as the drill bit 10 is kept turning, the teeth of the driven member 20 will be driven to mesh sequentially with the flutes 13 and 14 of the drill bit 10. The driven gear 20 can be driven easily to turn by the rotating drill bit 10 by virtue of the fact that the driven gear 20 has a weight of only five grams, and that the driven gear 20 has a load resistance which can be easily overcome, and further that each of the teeth of the driven gear 20 has an appropriate thickness, and still further that the center distance of the drill bit 10 and the tooth gap remain within a predetermined range.

As shown in FIG. 3, the drilling chip 16 is driven to move upwards along the flutes 13 and 14 of the drill bit 10 and is subsequently removed or cut by the tooth 21 of the driven gear 20, thereby preventing the drilling chip 16 from winding around the drill bit 10 and preventing the drilling chip 17 from depositing in the flutes 13 and 14 of the drill bit 10. Now referring to FIG. 4, a drilling chip 18 is shown being deposited in the flute 13. As the drill bit 10 is caused to move upwards, the drilling chip 18 is scraped off by the tooth a of the driven gear 20, which is always caused to move along the flute 13 at the moment when the drill bit 10 is caused to move upwards at the conclusion of a drilling action. In other words, the deposited drilling chip 18 is completely removed from the flute 13 by the tooth a of the driven gear 20 at such time when the driven gear 20 disengages the drill bit 10. The teeth of the driven gear 20 are so designed that the driven gear 20 of various dimensions can always cooperate with the drill bits 10 of various diameters or having various number of spirals as long as the distance between the drill bit 10 and the driven gear 20 is properly adjusted to prevent the rotating drill bit 10 from being interfered mechanically by the driven gear 20. The drill bit 10 has a tapered cutting edge 15 which can always mesh with the driven gear 20 when the drill bit 10 is caused to move downwards. In order to remove simultaneously the drilling chips deposited respectively in the flutes 13 and 14 of the drill bit 10, two driven gears 20A and 20B are provided by the opposite sides of the drill bit 10, as shown in FIG. 6.

Figures 6, 7:
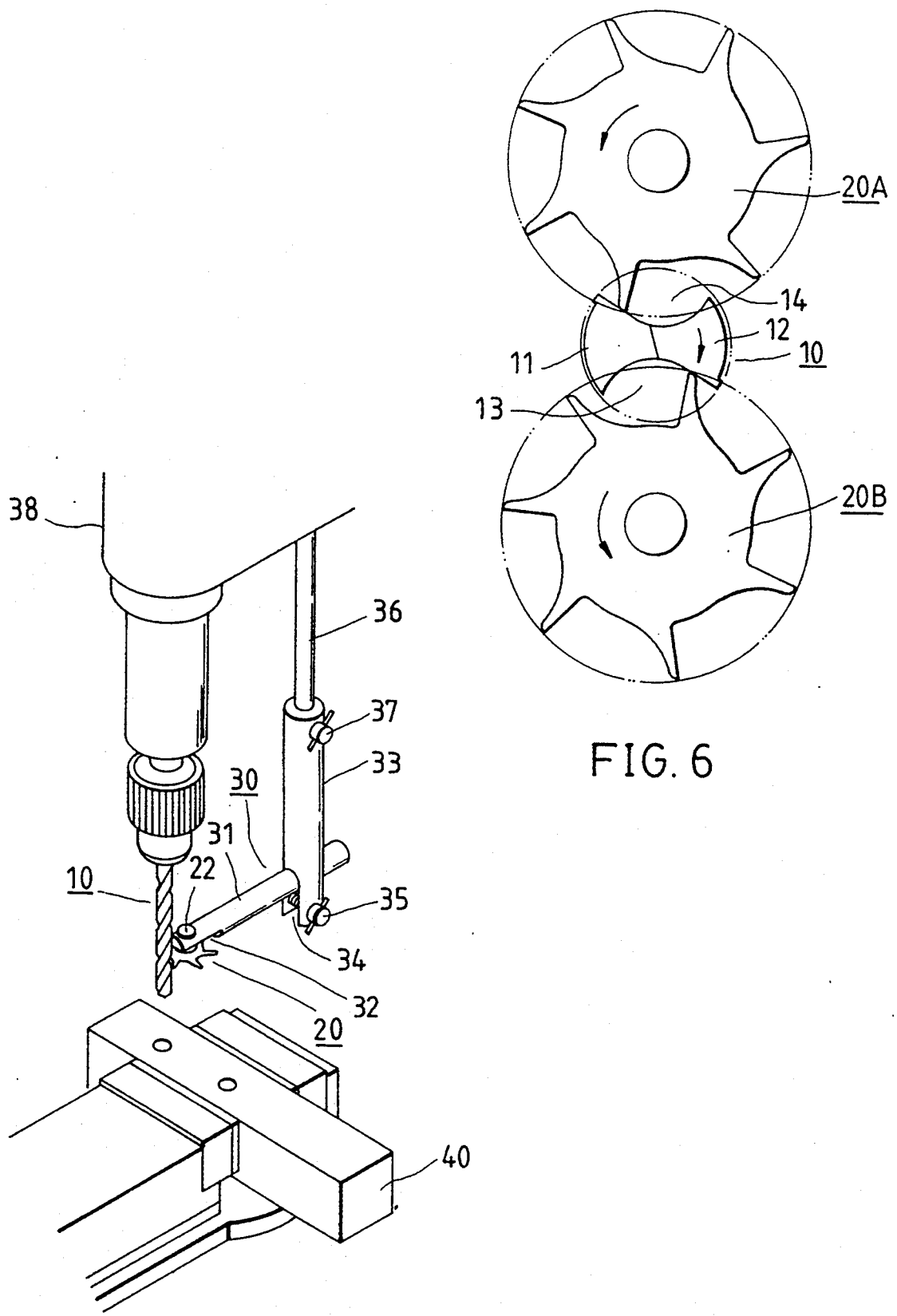
FIG. 6 is a schematic view showing that the present invention is provided with two sets of the driven gears located by a drill bit.
FIG. 7 shows a perspective view of the present invention in action.

As shown in FIG. 7, the driven gear 20 of the present invention is fastened to a support rod 30, which comprises a gear rod 31 having at one end thereof an indentation 32. The driven gear 20 is pivoted to one end of the gear rod 31 by a shaft pin 22. The gear rod 31 has another end which is fastened securely by a fastener 35 in a receiving slot 34 located at the lower end of a bracing rod 33. The bracing rod 33 has a top end into which the lower end of an inner rod 36 is fitted securely by another fastener 37. As a result, the length and the angular position of the bracing rod 33 can be adjusted as required. The inner rod 36 is fastened at the top end thereof to a drill press 38.

In operation, the length of the bracing rod 33 is properly adjusted such that the bracing rod 33 is opposite in location to the axis of the drill bit 10, and that the driven gear 20 is located over a work piece 40. Thereafter, the fastener 37 is tightened. The distance between the drill bit 10 and the driven gear 20 is properly adjusted by loosening the fastener 35 to permit the gear rod 31 to be adjusted as required. Thereafter, the fastener 35 is tightened to hold the gear rod 31 securely in place. It is therefore readily apparent that the device of the present invention is so easy to use.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A method for preventing a drilling chip from winding around a drill bit and for removing said drilling chip deposited in flutes of said drill bit, the method comprising:

providing a driven gear having teeth;

disposing said driven gear adjacent to said drill bit such that at least one tooth of said driven gear engages a flute of said drill bit and such that said drill bit is capable of rotating to actuate said driven gear to rotate such that said teeth of said driven gear mesh with said flutes of said drill bit one after another;

and drilling with said drill bit whereby said teeth scrape off a drilling chip deposited in said flute of said drill bit and prevent the drilling chip from winding around said drill bit.

2. The method according to claim 1, wherein the step of providing a driven gear further includes peripherally providing said drill bit with a plurality of said driven gear equal in number to a number of flutes of said drill bit.

3. A device for preventing a drilling chip from winding around a drill bit and for removing said drilling chip deposited in a flute of said drill bit comprising a support rod mounted on a drill press and provided with a gear rod having at one end thereof a receiving slot to which a driven gear is pivoted by a shaft pin such that said driven gear can be caused to turn freely, said gear rod further having another end that is pivoted to a bracing rod having an inner hole dimensioned to fit over an inner rod which can be telescopically adjusted and is fastened at one end thereof to said drill press, said driven gear having at least one tooth which can be caused to engage a flute of a drill bit of said drill press by adjusting the position of said gear rod.

* * * * *